United States Patent [19]

Horrocks

[11] 4,418,282
[45] Nov. 29, 1983

[54] METHOD AND APPARATUS FOR DETERMINING RANDOM COINCIDENCE COUNT RATE IN A SCINTILLATION COUNTER UTILIZING THE COINCIDENCE TECHNIQUE

[75] Inventor: Donald L. Horrocks, Placentia, Calif.

[73] Assignee: Beckman Instruments, Inc., Fullerton, Calif.

[21] Appl. No.: 278,770

[22] Filed: Jun. 29, 1981

[51] Int. Cl.³ ............................................. G01T 1/20
[52] U.S. Cl. ................................... 250/366; 250/328
[58] Field of Search .................. 250/328, 361 R, 362, 250/366, 369

[56] References Cited

U.S. PATENT DOCUMENTS 3,772,512  11/1973  Laney .................................. 250/366
4,031,392  6/1977   Giraud et al. ...................... 250/328
4,071,761  1/1978   Horrocks ........................... 250/328
4,181,855  1/1980   Horrocks ........................... 250/366

Primary Examiner—Janice A. Howell
Attorney, Agent, or Firm—R. J. Steinmeyer; R. R. Meads; G. T. Hampson

[57] ABSTRACT

A method and related apparatus for the determination of a random coincidence count attributable to chance coincidences of single-photon events which are each detected in only a single detector of a scintillation counter utilizing two detectors in a coincidence counting technique. Real and apparent coincidences of pulses are accumulated in a first counting device (28), and all pulses from the detectors (12) are accumulated in a second counting device (38), without regard for coincidence in time. The two counting devices are monitored during at least one random coincidence monitoring time occurring simultaneously with part of a sample counting period. The length and frequency of occurrence of the random coincidence monitoring times can be selected for particular counting measurement applications.

9 Claims, 4 Drawing Figures

METHOD AND APPARATUS FOR DETERMINING RANDOM COINCIDENCE COUNT RATE IN A SCINTILLATION COUNTER UTILIZING THE COINCIDENCE TECHNIQUE

BACKGROUND OF THE INVENTION

This invention relates generally to the measurement of radioactivity utilizing what is generally referred to as the coincidence counting technique, wherein events relating to radioactive decay are detected in two or more detectors within a given time interval, in order to eliminate various sources of error which would be introduced if only one detector were used. More particularly, the invention relates to a new and improved method and apparatus for eliminating a further source of error due to the detection of chance or random coincidences in the multiple detectors.

One of the most widely used devices for the measurement of radiation from radioactive substances is the scintillation counter. The basic element of a scintillation counter is a scintillation medium which absorbs incident radiation and emits photons as a result. Many of the emitted photons are incident upon a photocathode in a nearby multiplier phototube, and are converted to photoelectrons emitted from the photocathode. The electrons emitted from the photocathode are multiplied in number at a succession of phototube electrodes, called dynodes, and the output of the multiplier phototube is a measurable electrical pulse having a magnitude which is approximately proportional to the energy of the incident radiation.

A liquid scintillation counter operates on the same basic principle, except that the scintillation medium is a liquid into which is dissolved, suspended or otherwise intermixed the sample being tested. The radioactivity of the sample can then be measured by collecting the photons emitted from the scintillation medium in a multiplier phototube positioned near the sample, and counting the pulses generated by the tube in appropriate electrical circuitry. Depending on the characteristics of the sample being measured, and on the particular tests being performed, this electrical circuitry usually performs some type of pulse height analysis on the pulse output from the phototube, since it is usually desired to detect and count radioactive events within a particular range or window of energy levels.

A significant problem encountered in the measurement of radioactivity by means of scintillation counters is that there are a number of phenomena unrelated to the radioactivity of the sample which nevertheless result in the generation of output pulses from the multiplier phototube of a scintillation counter. These phenomena are frequently referred to as "singles" events since they are all characterized by the emission of single photons or photoelectrons. A relatively large source of "singles" events is the thermionic emission of electrons from the photocathode or from the dynodes of the multiplier phototube itself. Such electrons are emitted independently of any detected radiation, and can result in significant error, especially if the tubes are operated at relatively high voltages, the typical case where high amplification factors are being used, as in the measurement of relatively low radiation levels. This thermionic emission of electrons is also referred to as "tube noise."

In liquid scintillation counters, the sample itself may emit photons by some process unrelated to its radioactivity. The sample material could exhibit some degree of chemiluminescence, i.e., there may be some chemical reaction or reactions occurring within the sample material which result in the emission of photons. The sample material may also be subject to the processes of bioluminescence or photoluminescence, which also generate photons independently of the level of radioactivity of the sample material. In addition, the presence of low-level background radiation, static electrical discharges, or a leakage of ambient light into the counter, could give rise to "singles" events detectable by the scintillation counter.

Use of the well known coincidence counting technique substantially reduces the detection of "singles" events by a scintillation counter. In a liquid scintillation counter this technique is utilized by employing at least two multiplier phototubes disposed one on each side of the sample. The emission of many single radioactive particles by the sample can typically result in the emission of about seven or more photons simultaneously, or nearly simultaneously. Thus, there is a high probability that such an event will be detected by both phototubes at nearly the same time. A "singles" event, however, such as one resulting from chemiluminescence, or from a thermionically emitted electron in one of the tubes, would result in an output pulse from only one of the tubes. It can be appreciated, then, that the use of the coincidence counting technique results in the elimination of most of the "singles" events from the counting process.

It will also be apparent, however, that, because of the random nature of the "singles" events, there is a significant probability that a "singles" event could be detected in one tube at nearly the same instant in time that one is detected in the other tube. There is, therefore, a random coincidence rate resulting from random or chance coincidences of unrelated "singles" events. Mathematically, the random coincidence count rate $S_c$ is given by:

$$S_c = 2 t_R S_1 S_2 \qquad (1)$$

where:
  $t_R$ = the resolving time of the coincidence counter, i.e., the longest time separating two pulses which would still be considered coincident,
  $S_1$ = the "singles" count rate measured by one of the multiplier phototubes, and
  $S_2$ = the "singles" count rate measured by the other of the multiplier phototubes.

Under normal operation, a liquid scintillation counter will give a total coincidence count rate (TC) which will be the sum of the sample coincidence count rate ($S_a$) and the "singles" random coincidence count rate ($S_c$). That is:

$$TC = S_a + S_c \qquad (2)$$

Any user of a liquid scintillation counter ideally needs to know the value of $S_c$ so that, where possible, a correction can be made to obtain the correct value of radiation attributable to the sample only. Even where direct correction is not possible, because testing is being performed in specific energy level "windows," the user of the counter could still use the value of $S_c$ as an indication of the reliability of the measured count rate.

Prior to this invention, determination of the random coincidence rate was typically made immediately prior to or immediately after measurement of a sample count rate, as shown for example in U.S. Pat. No. 4,071,761, which has the same inventor as the present application. Alternatively, the random coincidence count rate can be estimated by means of a technique employing delay devices, based on the principle that real coincidences will be eliminated by delaying the signals from one of the detectors but the chance coincidences will occur at the same measurable rate, since they are random by nature and a time delay does not affect this characteristic of randomness. U.S. Pat. No. 4,181,855, also having the same inventor as the present application, describes and claims such a delay technique for estimating the random coincidence count.

Although both the aforementioned techniques are generally satisfactory in most respects, the former technique does not allow the measurement of random coincidence count rate while actually measuring the radioactivity of the sample, and the latter technique requires more complex apparatus and is still subject to possible statistical error in some cases. Accordingly, there is still a significant need for an improved coincidence counting technique, to provide a simple alternative to the solutions set forth in the aforementioned patents for the reliable estimation of the error attributable to random or chance coincidence of singles events. The present invention fulfills this need.

SUMMARY OF THE INVENTION

The present invention resides in a method and related apparatus for determining the random coincidence count due to different events which each generate single quanta of energy and which happen to occur in practically coincident pairs detectable by two independent detectors in a scintillation counter. Briefly, and in general terms, the method of the invention comprises the steps of counting the number of real and apparent coincidences between pulses from the two detectors over a sample count period to determine the radioactivity of the sample, counting the number of real and apparent coincidences between pulses from the two detectors over a random coincidence monitoring time occurring simultaneously with a portion of the sample count period, counting the number of events detected in both detectors over the random coincidence counting time, regardless of their coincidence in time, and determining from the results of the second and third counting steps a random coincidence count rate attributable to chance coincidences of single-quantum events.

In accordance with an important aspect of the invention, the random coincidence monitoring time is selectable both in length and in frequency of occurrence during the sample count period. In this manner, the random coincidence count rate can be measured at selected intervals and for selected times over the sample count period.

In terms of novel apparatus, the invention comprises first counting means for counting real and chance coincidences between signals from the two detectors, second counting means for counting the pulses from both detectors regardless of coincidence in time, control means for obtaining from the first and second counting means counts recorded over a random coincidence monitoring time occurring simultaneously with a portion of the sample count time, and means for calculating from the counts recorded during the random coincidence monitoring time, the random coincidence count rate. In accordance with an important aspect of the invention, the apparatus also includes means for selecting the random coincidence monitoring time and the frequency of occurrence of the random coincidence monitoring period during the sample count period.

Other aspects and advantages of the present invention will become apparent from the following more detailed description, taken in conjunction with the accompanying drawings.

DETAILED DESCRIPTION

Figure 1:
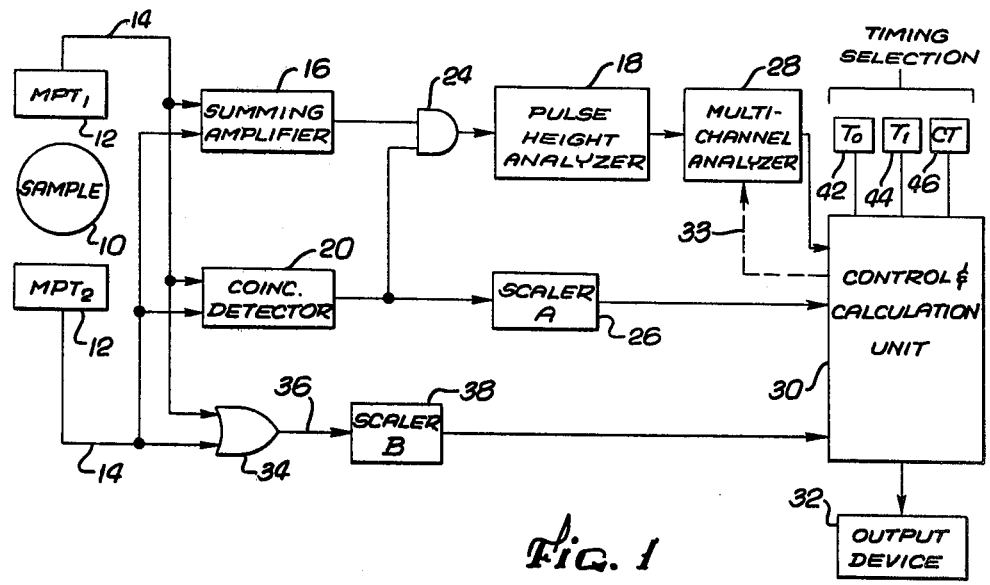
FIG. 1 is a block diagram of a measurement system incorporating a scintillation counter and associated components for practicing the coincidence counting technique in accordance with the principles of the present invention.

As shown in the drawings for purposes of illustration, the present invention is principally concerned with a method for determining the error due to chance coincidences detected by utilizing the coincidence counting technique in a scintillation counter. As previously indicated, the coincidence counting technique utilizes at least two radiation detectors, usually multiplier phototubes, in order to avoid counting single-photon events resulting from chemiluminescence or similar phenomena in the sample being measured, or resulting from phototube noise arising from thermionic emission of electrons. Although these "singles" events will normally be detected in only one multiplier phototube, the random nature of their occurrence results in the detection of a significant number of real coincidences which are unrelated to the radio-activity being monitored.

FIG. 1 shows in block diagram form an arrangement for radioactivity measurement using a liquid scintillation counter. A sample 10 is placed between a pair of photon detectors 12, which usually take the form of multiplier phototubes. In liquid scintillation counters, radioactive particles emitted by the sample material are absorbed by a liquid scintillation medium mixed with the sample itself, and the generation of a number of photons results from each emission of a radioactive particle. The photons are simultaneously, or nearly simultaneously, detected by the multiplier phototubes 12 and converted into measurable electrical pulses for output on lines 14. The radioactivity measurement apparatus further includes a summing amplifier 16, a pulse height analyzer 18, a coincidence detector 20, a coincidence gate 24, a scaler 26, referred to as scaler A, a multichannel analyzer 28, a control and calculation unit 30, and an output device 32.

The output pulses from the multiplier phototubes 12 are transmitted to the summing amplifier 16, the output of the amplifier being fed to the coincidence gate 24, the output of which is fed in turn to the pulse height analyzer 18, and thence to the multichannel analyzer. The pulse height analyzer 18 and multichannel analyzer 28 together sort the pulses into selected energy level ranges. As indicated by the broken line 33 from the control and calculation unit 30, the multichannel analyzer can be controlled to provide a count of pulses falling within a selectable range of pulse heights or energy levels.

The output pulses from the multiplier phototubes 12 are also transmitted to the coincidence detection circuit 20, which provides an output only if the input pulses from the tubes are essentially in coincidence. As used herein, the expression "essentially in coincidence" refers to a pair of pulses, one from each of the phototubes 12, occurring within a resolving time interval $t_R$. A resolving time interval of thirty nanoseconds is typical for liquid scintillation counters.

The coincidence signal from the coincidence detection circuit 20 and the output from the summing amplifier 16 are applied to the coincidence gate 24, which functions as an AND gate producing an output only when both signals are in the same selected condition. The scaler 26, referred to as scaler A in the drawings, also receives output pulses from the coincidence detection circuit 20, and accumulates a count of coincident pulses, without regard to their energy level. The count in the scaler 26 can be accessed by the control and calculation unit 30. In conventional measurement of a sample count, the change in a selected count in the multichannel analyzer 28, over a selected sample count period, is obtained by the control and calculation unit 30 and printed out as a sample count rate on the output device 32.

In accordance with the invention, monitoring of the occurrence of chance or random coincidences occurs simultaneously with the measurement of the sample count rate. Random coincidence monitoring is effected by means of a logical OR gate 34, which also receives inputs from the two detectors 12, and generates an output signal on line 36 indicative of the occurrence of pulses from both detectors, regardless of coincidence in time. These pulses on line 36 are input to a second scaler 38, referred to as scaler B in the drawings, and the accumulated count in scaler B is accessible over line 40 by the control and calculation unit 30. Scalers A and B are read at the start and finish of each random coincidence monitoring time, and from the counts thus obtained, a random coincidence count rate is calculated for each random coincidence monitoring time. In accordance with another important aspect of the invention, and as will be explained further below, the random coincidence monitoring time $T_0$ can be selected, as indicated at 42, as can the time interval $T_i$ between the starting times of each random coincidence monitoring time, as indicated at 44. In addition, the counting time for the sample, CT, can also be selected as indicated at 46.

From equation (2), the total coincidence count rate is given by the expression:

$$TC = S_a + S_c \quad (2)$$

The count rate of pulses appearing on line 36 from the OR gate 34 is the total coincidence and non-coincidence count rate, referred to as TCN, and is given by the expression:

$$TCN = (S_1 - S_c) + (S_2 - S_c) + TC \quad (3)$$

However, it can readily be shown that, even for very high values of "singles" counts, $S_1$ and $S_2$, the value of $S_c$ is only a very small fraction of $S_1$ or $S_2$, and can, for all practical purposes, be neglected in the expression for TCN. For example, if the "singles" count $S_1 = S_2 = 2.5 \times 10^6$ counts per minute, and if the resolution time $T_c = 0.5 \times 10^{-9}$ minute, then $S_c$ can be computed from equation (1) as 6,250 counts per minute, i.e., 0.25% of $S_1$ or $S_2$. Accordingly, the expression (3) can be approximated:

$$TCN = S_1 + S_2 + TC. \quad (4)$$

Since "singles" events resulting from most will probably affect both phototubes equally, it can be assumed that $S_1 = S_2$. Therefore:

$$S_1 = S_2 = \tfrac{1}{2}(TCN - TC). \quad (5)$$

Then $S_c$ can be computed from:

$$S_c = 2 t_R S_1 S_2 = (t_R/2)(TCN - TC)^2. \quad (6)$$

Equation (6) is the equation used in the control and calculation unit 30 to obtain a random coincidence count rate.

Figure 4:
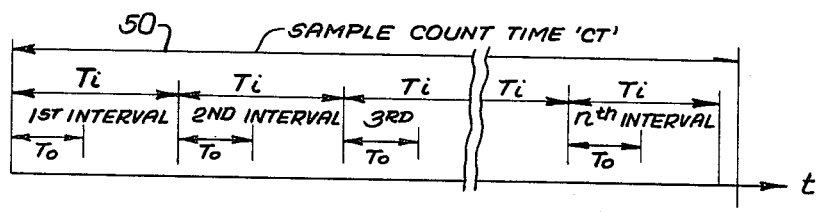
FIG. 4 is a timing diagram showing the relationship between a sample count time, a random coincidence monitoring time, and a random coincidence time interval.

So that the apparatus and method of the invention can be readily adapted for use in a wide variety of radioactivity measurement applications, means are provided for selection of the random coincidence monitoring time and the frequency of occurrence of the monitoring time during a sample count time. FIG. 4 shows the relationship between these selectable times. The sample count time CT, indicated at 50, is shown as being divided into in time intervals $T_i$. In many instances, the selected value of $T_i$ will not fit into the sample count time an integral number of times. For this reason, the nth interval is defined as the last interval containing a random coincidence monitoring time $T_0$ that falls wholly within the sample count time. In other words, no random coincidence monitoring time $T_0$ will extend beyond the sample count time CT. The random coincidence monitoring time $T_0$ always begins at the start of one of the time intervals $T_i$. The monitoring time $T_0$ may be as long as the time interval $T_i$, but will usually be chosen to be shorter. By appropriate selection of the interval $T_i$ and the monitoring time $T_0$ with respect to the sample count time CT, measurements of the random coincidence count rate can be obtained over an entire sample counting period. These measurements provide the system user with an accurate indication of variations in the random coincidence count rate during the period of sample measurement. The random count measurements can be used either to make direct corrections to the sample count, or can be considered with the sample count in subsequent analysis of the radioactivity measurements.

Figure 3:
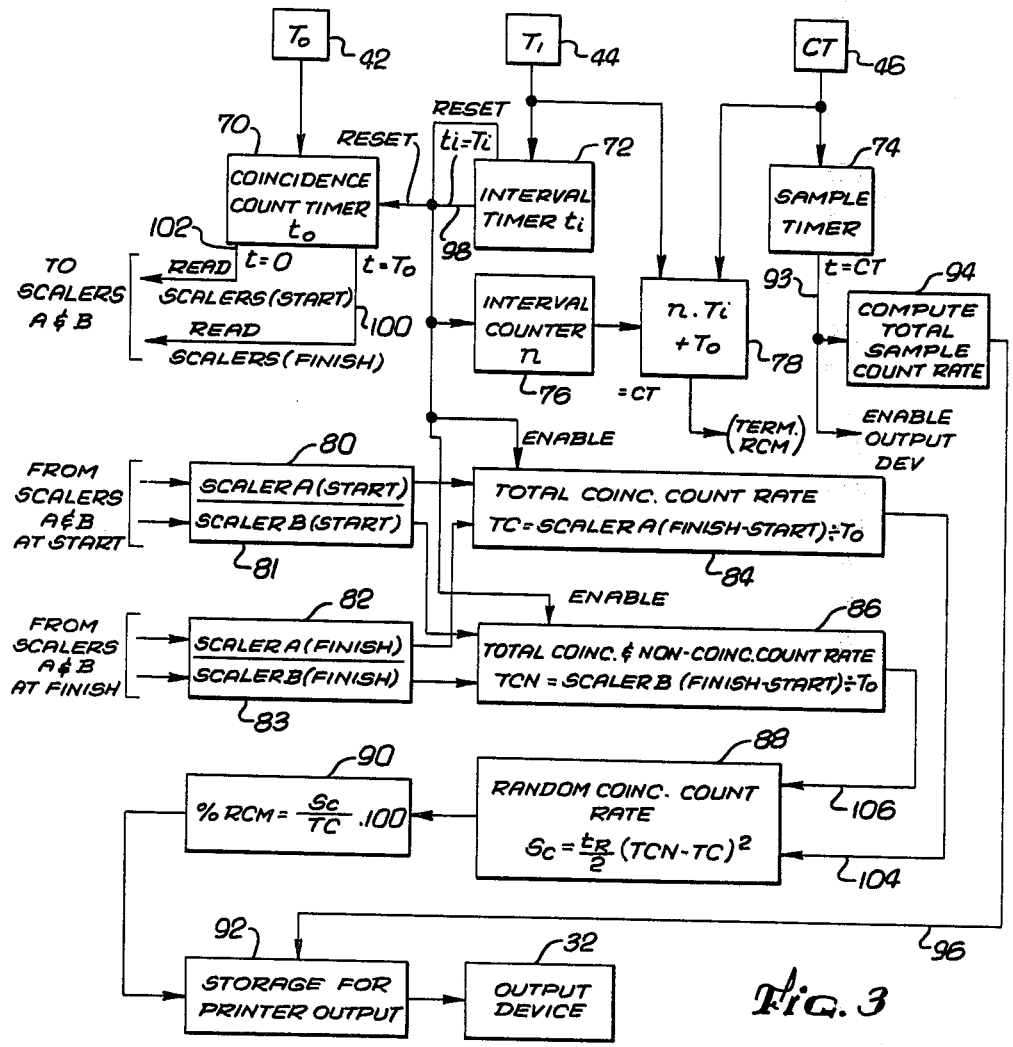
FIG. 3 is a block diagram of a portion of the measurement system shown in FIGS. 1 and 2, showing more detail of the control and calculation unit in those figures.

As shown in FIG. 3, the control and calculation unit 30 includes a coincidence count timer 70, an interval timer 72 and a sample timer 74, to which the values of $T_0$, $T_i$, and CT are input as indicated at 42, 44 and 46, respectively. The control and calculation unit 30 also includes an interval counter 76, an arithmetic circuit 78, count storage registers 80–83, arithmetic calculation circuits 84, 86, 88 and 90, and a storage device 92 for holding printer output information. It will be appreciated from the following description that the control and calculation unit 30 could take many different forms, including both hard-wired electrical circuitry and microprocessor circuitry. Whichever form is chosen for implementation of the unit 30, however, the basic functions of the circuitry with respect to the present invention are those set forth in FIG. 3 and described herein. The sample timer 74 is reset to zero at the beginning of a sample count time and generates an output signal on line 93 when the selected time CT is reached. A computation module 94 computes the total sample count rate from the counts accumulated in the multichannel analyzer 28 during the counting time. This computation is in accordance with conventional usage of a scintillation counter. The calculated sample count rate is fed over line 96 to the storage device 92 for subsequent output to the output device 32. The output signal on line 93 may also be used to enable the output device at the end of the sample count time.

The interval timer 72, the instantaneous value of which is indicated as $t_i$, is also reset at the beginning of the sample count time, and then repeatedly counts up to a time $T_i$, resetting itself to zero on each occasion. The interval timer 72 generates a reset signal on line 98 which is used to reset the interval timer itself and to reset the coincidence count timer 70. The coincidence count timer 70, the instantaneous value of which is indicated at $t_0$, counts up to a value of $T_0$ and then generates a control signal on line 100. The timer 70 also generates a control signal on line 102 when the count is equal to zero. The control signal on line 102 initiates reading the scalers A and B at the start of the random coincidence monitoring time and the control signal on line 100 initiates reading the scalers at the finish of the random coincidence monitoring time.

Count values from the scalers A and B are input to the registers 80 and 81, respectively, at the start of the random coincidence monitoring time, and count values from the scalers are input to registers 82 and 83, respectively, at the finish of the random coincidence monitoring time. The reset signal on line 98 from the interval timer 72 is also used as an enable signal, to enable operation of the computation circuits 84, 86, 88 and 90. The first computation circuit 84 takes the scaler A values from registers 80 and 82, subtracts one from the other and computes the total count rate (TC) during the random coincidence monitoring time by dividing the result of the subtraction by the monitoring time $T_0$. Similarly, circuit 86 computes the total coincidence and non-coincidence count rate (TCN) by subtracting the scaler B starting count from the finishing count, and dividing the result by $T_0$. The values of the total coincidence count rate TC and the total coincidence and non-coincidence count rate TCN are then fed over lines 104 and 106, respectively, to the computation circuit 88, which computes a value of random coincidence count rate $S_c$ in accordance with equation (6). This value of random coincidence count rate is next fed over line 108 to the computation circuit 90, which further computes the random coincidence count rate as a percentage of the total coincidence count rate in accordance with the formula:

$$\%RCM = (S_c/TC) \cdot 100 \qquad (7)$$

The calculated random coincidence count rate $S_c$ and the percentage value computed in block 90 are fed to the storage module 92 for output to the output device 32 at the end of the sample count time.

The computations of the random coincidence count rate, $S_c$ and %RCM, are made at the end of each random coincidence monitoring time $T_0$. The interval counter 76 keeps count of the number of intervals $T_i$ that have occurred since the start of the sample count time, and the arithmetic unit 78 multiplies the number, n, of the next interval to be started by $T_i$, adds $T_0$ to the product, and compares the result with CT, the sample count time. When the result $n \cdot T_i + T_0$ is greater than or equal to CT, a signal is generated to terminate random coincidence monitoring, as indicated at 110. Thus, the last time interval to include random coincidence monitoring is the last one that includes a random coincidence count time completely concurrent with the sample count time.

Figure 2:
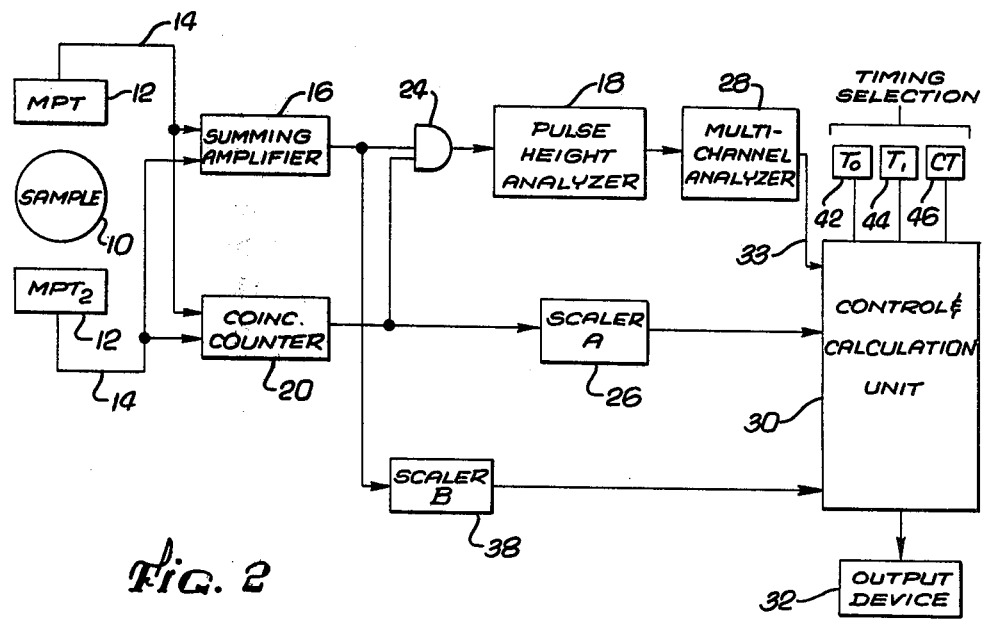
FIG. 2 is a block diagram similar to FIG. 1, showing a preferred configuration of the apparatus of the invention.

As apparent from FIG. 2, the OR gate 34 of FIG. 1 is not essential to the apparatus of the invention. In effect, the summing amplifier 16 also functions as an OR gate, accepting signals from both detectors 12, regardless of their coincidence in time. Thus, the output of the summing amplifier 16 may be connected directly to scaler B, indicated by reference numeral 38, as well as to the coincidence gate 24. In fact, this is the presently preferred structural arrangement, since it eliminates the OR gate 34, which, while useful for purposes of explanation of the invention, is not essential to its operation.

It will be appreciated from the foregoing that the present invention provides a simple and practical alternative technique for obtaining an indication of the random coincidence count rate in a scintillation counter using the coincidence technique. It will also be appreciated that, although a specific embodiment of the invention has been described in detail for purposes of illustration, various modifications may be made without departing from the spirit and scope of the invention. Accordingly the invention is not to be limited except as by the appended claims.

I claim:

1. For use with a scintillation counter utilizing at least two detectors in a coincidence counting technique, a method for determining a random coincidence count due to events resulting in single-quantum emissions which may chance to occur in such a manner that pairs of essentially coincident single-quantum events are detected one on each detector and are erroneously counted as radioactive disintegrations occurring in a sample, said method comprising the steps of:

counting the number of essentially coincident events detected in both detectors of the counter during a sample count time to measure the radioactivity of the sample;

counting the number of essentially coincident events detected in both detectors of the counter during a random coincidence monitoring time occurring during part of the sample count time;

counting the total number of events detected in both detectors, regardless of coincidence in time, during the random coincidence monitoring time; and determining from the results of said counting steps during the random coincidence monitoring time, a random coincidence count rate attributable to chance coincidences of single-quantum events in accordance with the equation, $$S_c = (t_R/2)(TCN-TC)^2,$$

where:

$S_c$ = random coincidence count rate, $t_R$ = coincidence resolving time, which is the longest time by which events can be separated and still considered coincident, TC = counts per minute recorded in said second counting step, and TCN = counts per minute recorded in said third counting step.

2. A method as set forth in claim 1, and further including the step of determining from the random coincidence count rate a proportional correction, for application to other measurements of radiation from the sample, by dividing the random coincidence count rate by the measured coincidence count rate.

3. A method as set forth in claim 1, and further including the steps of:
   selecting the length of the random coincidence monitoring time; and
   selecting a time interval between consecutive random coincidence monitoring times during the same sample count time.

4. For use with a scintillation counter utilizing at least two detectors in a coincidence counting technique, a method for determining a random coincidence count due to events resulting in single-quantum emissions which may chance to occur in such a manner that pairs of essentially coincident single-quantum events are detected one on each detector and are erroneously counted as radioactive disintegrations occurring in a sample, said method comprising the steps of:
   recording the occurrences of essentially coincident events detected in both detectors during a sample count time, to obtain a measure of the radioactivity of the sample;
   simultaneously with said recording step, recording the occurrences of events detected in either or both detectors, without regard to coincidence in time,
   deriving from said first-mentioned recording step a first count, of essentially coincident events detected over at least one random coincidence monitoring time $T_0$ during the sample count time;
   deriving from said second-mentioned recording step a second count, of both coincident and non-coincident events during the same random coincidence monitoring time $T_0$; and
   calculating a random coincidence count rate from the first and second counts obtained in said deriving steps.

5. A method as set forth in claim 4, wherein said calculating step performs the calculation:

$$S_c = (t_R/2)(TCN - TC)^2,$$

where:
   $S_c$ = random coincidence count rate,
   $t_R$ = coincidence resolving time, which is the longest time by which events can be separated and still considered coincident,
   TC = first count divided by $T_0$, and
   TCN = second count divided by $T_0$.

6. A method as set forth in claim 5, and further including the steps of:
   selecting a value for $T_0$; and
   selecting a value for $T_i$, the time interval between the start of successive random coincidence monitoring time $T_0$ during the sample count time.

7. For use with a scintillation counter utilizing at least two detectors in a coincidence counting technique, apparatus for determining a random coincidence count due to events resulting in single-quantum emissions which may chance to occur in such a manner that pairs of essentially coincident single-quantum events are detected one in each detector and are erroneously counted as radioactive disintegrations occurring in a sample, said apparatus comprising:
   coincidence detection means for detecting real and chance coincidences between pulses from the two detectors;
   means for detecting pulses from the two detectors without regard to coincidence in time;
   first counting means for accumulating a count of pulses derived from said coincidence detection means;
   second counting means for accumulating a count of pulses derived from said means for detecting pulses without regard for coincidence in time;
   means for obtaining corresponding first and second count values from said first and second counting means over a random coincidence monitoring time $T_0$ occurring within a longer sample counting time; and
   means for calculating a random coincidence count rate from said first and second count values.

8. Apparatus as set forth in claim 7, and further including means for selecting the random coincidence monitoring time and means for selecting a time interval between consecutive random coincidence monitoring times within the same sample count time.

9. Apparatus as set forth in claim 7, wherein said means for calculating a random coincidence count rate functions in accordance with the equation:

$$S_c = (t_R/2)(TCN - TC)^2,$$

where:
   $S_c$ = random coincidence count rate,
   $t_R$ = coincidence resolving time, which is the longest time by which events can be separated and still considered coincident,
   TC = first count value divided by $T_0$, and
   TCN = second count value divided by $T_0$.

* * * * *